United States Patent
Fujishiro

(10) Patent No.: US 12,069,734 B2
(45) Date of Patent: Aug. 20, 2024

(54) COMMUNICATION CONTROL METHOD

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 398 days.

(21) Appl. No.: 17/477,197

(22) Filed: Sep. 16, 2021

(65) Prior Publication Data

US 2022/0007427 A1 Jan. 6, 2022

Related U.S. Application Data

(63) Continuation of application No. PCT/JP2020/013305, filed on Mar. 25, 2020.

(30) Foreign Application Priority Data

Mar. 27, 2019 (JP) ................................. 2019-060236

(51) Int. Cl.
*H04W 74/0833* (2024.01)
*H04W 48/16* (2009.01)

(52) U.S. Cl.
CPC ....... *H04W 74/0833* (2013.01); *H04W 48/16* (2013.01)

(58) Field of Classification Search
CPC ........................... H04W 48/16; H04W 74/0833
USPC ........................................................ 370/329
See application file for complete search history.

(56) References Cited

U.S. PATENT DOCUMENTS

| | | | |
|---|---|---|---|
| 7,679,511 B2 | 3/2010 | Lauper | |
| 2018/0110074 A1* | 4/2018 | Akkarakaran | H04W 72/21 |
| 2018/0110075 A1* | 4/2018 | Ly | H04W 74/0833 |
| 2018/0288683 A1 | 10/2018 | Bendlin et al. | |
| 2018/0324865 A1* | 11/2018 | Hui | H04W 74/004 |
| 2020/0037367 A1* | 1/2020 | Kim | H04W 74/006 |

FOREIGN PATENT DOCUMENTS

JP 2007-529800 A 10/2007

OTHER PUBLICATIONS

3GPP TSG RAN Meeting #82 RP-182-894 (Year: 2018).*
3GPP TSG RAN WG1 ting #96 R1-1902467 (Year: 2019).*

(Continued)

*Primary Examiner* — William Nealon
(74) *Attorney, Agent, or Firm* — Studebaker & Brackett PC

(57) ABSTRACT

A communication control method for controlling a two-step random access procedure for completing a contention based random access procedure by performing transmission from user equipment to a base station and performing transmission from the base station to the user equipment after the transmission from the user equipment to the base station includes broadcasting, by the base station, system information indicating a PUSCH resource associated with a preamble resource, and receiving, by the user equipment, the system information. Performing the transmission from the user equipment to the base station includes transmitting, by the user equipment, a random access preamble to the base station, and using, by the user equipment, the PUSCH resource associated with the preamble resource used to transmit the random access preamble, based on the system information, to transmit a control message to the base station.

6 Claims, 8 Drawing Sheets

(56) References Cited

OTHER PUBLICATIONS

ZTE Corporation, Sanechips, "New work item: 2-step RACH for NR", 3GPP TSG RAN Meeting #82; RP-182894; Dec. 10-13, 2018; pp. 1-5; Sorrento, Italy.
ASUStek, MediaTek Inc. "Consideration on use cases of 2-step RACH procedure", 3GPP TSG-RAN WG2 Meeting #NR Ad Hoc; R2-1700356; Jan. 17-19, 2017; pp. 1-5; Spokane, USA.
Intel Corporation, "Procedure for two-step Rach", 3GPP TSG RAN WG1 #96; R1-1902467; Feb. 25-Mar. 1, 2019; pp. 1-6; Athens, Greece.
Huawei, Hisicion, "Consideration on 2-step RACH parameters and grant", 3GPP TSG-RAN WG2 Meeting #104; R2-1816605; Nov. 12-16, 2018; pp. 1-4; Spokane, USA.
Huawei, HiSilicon; "PRACH resource multiplexing to support low cost MTC and coverage enhancement", 3GPP TSG RAN WG1 Meeting #76, R1-140027, Feb. 10-14, 2014, pp. 1-7, Prague, Czech Republic.
InterDigital Communications; "Random Access Procedure"; 3GPP TSG-RAN WG1 #87; R1-1612311; Nov. 14-18, 2016; pp. 1-5; Reno, USA.
InterDigital Communications; "Random Access and Support for Multiple Numerologies for NR"; 3GPP TSG-RAN WG1 #87; R1-1612310; Nov. 14-18, 2016; pp. 1-5; Reno, USA.
ZTE Corporation, Sanechips; "Msg2 payload contents for 2-step RACH"; 3GPP TSG-RAN WG2 Meeting #104; R2-1817064; Nov. 12-16, 2018; pp. 1-10; Spokane, USA.
Nokia, Nokia Shanghai Bell; "On 2-step RACH Procedure"; 3GPP TSG RAN WG1 #96; R1-1902136; Feb. 25-Mar. 1, 2019; pp. 1-11; Athens, Greece.

* cited by examiner

COMMUNICATION CONTROL METHOD

RELATED APPLICATIONS

The present application is a continuation based on PCT Application No. PCT/JP2020/013305, filed on Mar. 25, 2020, which claims the benefit of Japanese Patent Application No. 2019-060236 filed on Mar. 27, 2019. The content of which is incorporated by reference herein in their entirety.

TECHNICAL FIELD

The present disclosure relates to a communication control method in a mobile communication system.

BACKGROUND ART

PL 1 describes a two-step random access procedure that completes a contention based random access procedure by a first step for performing transmission from user equipment to a base station, and a second step for performing transmission from the base station to the user equipment after the first step.

CITATION LIST

Non-Patent Literature

NPL 1: 3GPP Contribution "RP-182894", December 2018

SUMMARY

The present disclosure relates to a technique for controlling a two-step random access procedure for completing a contention based random access procedure by performing transmission from user equipment to a base station and performing transmission from the base station to the user equipment after the transmission from the user equipment to the base station.

A communication control method according to a first aspect is a communication control method for controlling a two-step random access procedure being a contention based random access procedure performed between user equipment and a base station, the communication control method including: receiving, by the user equipment, information related to permission to perform the two-step random access procedure, from the base station; and in a case of determining, based on the information, that the two-step random access procedure is permitted to be performed, transmitting, by the user equipment, MsgA including an identifier of the user equipment, to the base station.

DESCRIPTION OF EMBODIMENTS

A mobile communication system according to an embodiment will be described with reference to the drawings. In the description of the drawings, the same or similar parts are designated with the same or similar reference signs.

Configuration of Mobile Communication System

First, a configuration of a mobile communication system according to an embodiment will be described. The mobile communication system according to one embodiment is a 5G system of the Third Generation Partnership Project (3GPP). However, Long Term Evolution (LTE) may be at least partially applied to the mobile communication system.

Figure 1:
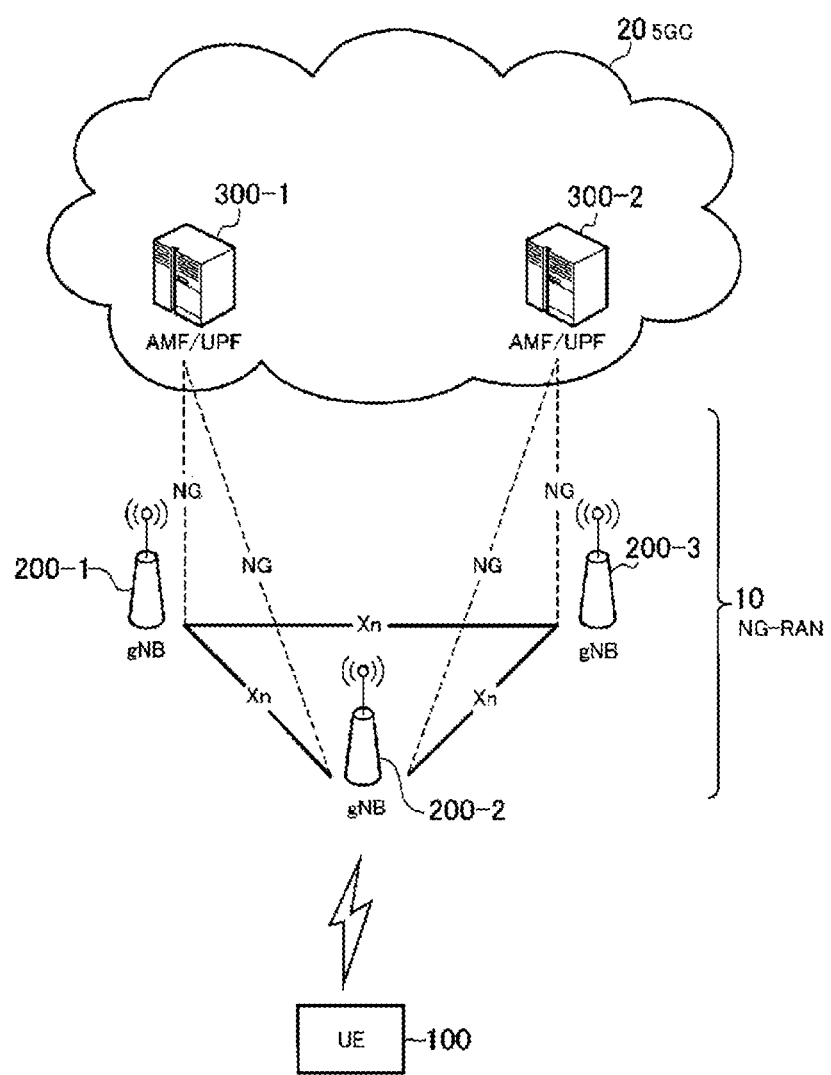
FIG. 1 is a diagram illustrating a configuration of a mobile communication system according to an embodiment.

FIG. 1 is a diagram illustrating a configuration of the mobile communication system according to an embodiment.

As illustrated in FIG. 1, the mobile communication system includes User Equipment (UE) 100, a 5G radio access network (Next Generation Radio Access Network (NG-RAN)) 10, and a 5G core network (5GC) 20.

The UE 100 is a movable apparatus. The UE 100 may be any apparatus utilized by a user. Examples of the UE 100 include a mobile phone terminal (including a smartphone), a tablet terminal, a notebook PC, a communication module (including a communication card or chip set), a sensor, an apparatus provided on a sensor, a vehicle, an apparatus provided on a vehicle (Vehicle UE), a flying object, and an apparatus provided on a flying object (Aerial UE).

The NG-RAN 10 includes base stations (each of which is referred to as a "gNB" in the 5G system) 200. The gNB 200 may be also referred to as an NG-RAN node. The gNBs 200 are connected to each other via an Xn interface that is an inter-base-station interface. The gNB 200 manages one or more cells. The gNB 200 performs radio communication with the UE 100 that has established connection with a cell of the gNB 200. The gNB 200 has a radio resource management (RRM) function, a user data (hereinafter simply referred to as "data") routing function, a measurement control function for mobility control and scheduling, and/or the like. A "cell" is used as a term that indicates a minimum unit of a radio communication area. A "cell" is also used as a term that indicates a function or resource that performs radio communication with the UE 100. One cell belongs to one carrier frequency.

Note that a gNB may be connected to an Evolved Packet Core (EPC) which is an LTE core network, or an LTE base station may be connected to a 5GC. Moreover, the LTE base station may be connected to the gNB via the inter-base-station interface.

The 5GC 20 includes an Access and Mobility Management Function (AMF) and a User Plane Function (UPF) 300. The AMF performs various types of mobility control for the UE 100, and the like. The AMF manages information of an area in which the UE 100 exists by communicating with the UE 100 by using Non-Access Stratum (NAS) signaling. The UPF performs data transfer control. The AMF and the UPF are connected to the gNB 200 via an NG interface which is a base station to core network interface.

Figure 2:
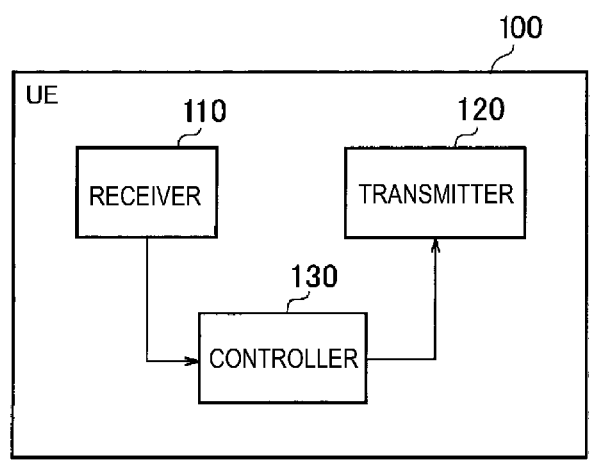
FIG. 2 is a diagram illustrating a configuration of user equipment according to an embodiment.

FIG. 2 is a diagram illustrating a configuration of the UE 100 (user equipment).

As illustrated in FIG. 2, the UE 100 includes a receiver 110, a transmitter 120, and a controller 130.

The receiver 110 performs various types of reception under control of the controller 130. The receiver 110 includes an antenna and a receiving unit. The receiving unit converts a radio signal received by the antenna into a baseband signal (reception signal) and outputs the signal to the controller 130.

The transmitter 120 performs various type of transmission under control of the controller 130. The transmitter 120 includes the antenna and a transmitting unit. The transmitting unit converts the baseband signal (transmission signal) to be output by the controller 130 into a radio signal and transmits the signal from the antenna.

The controller 130 performs various type of control in the UE 100. The controller 130 includes at least one processor and at least one memory electrically connected to the processor. The memory stores programs to be executed by the processor and information used for processing by the processor. The processor may include a baseband processor and a Central Processing Unit (CPU). The baseband processor performs modulation/demodulation and coding/decoding of the baseband signal, and the like. The CPU executes the programs stored in the memory to perform various types of processing.

Figure 3:
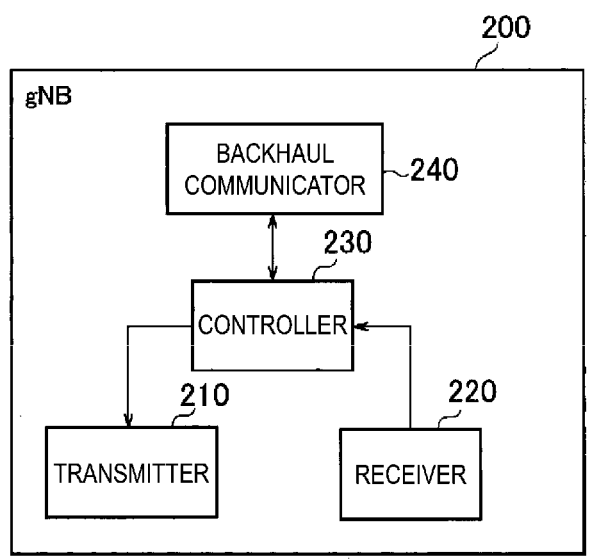
FIG. 3 is a diagram illustrating a configuration of a base station according to an embodiment.

FIG. 3 is a diagram illustrating a configuration of the gNB 200 (base station).

As illustrated in FIG. 3, the gNB 200 includes a transmitter 210, a receiver 220, a controller 230, and a backhaul communicator 240.

The transmitter 210 performs various types of transmission under control of the controller 230. The transmitter 210 includes an antenna and a transmitting unit. The transmitting unit converts a baseband signal (transmission signal) to be output by the controller 230 into a radio signal and transmits the signal from the antenna.

The receiver 220 performs various types of reception under control of the controller 230. The receiver 220 includes the antenna and a receiving unit. The receiving unit converts the radio signal received by the antenna into a baseband signal (reception signal) and outputs the signal to the controller 230.

The controller 230 performs various type of control in the gNB 200. The controller 230 includes at least one processor and at least one memory electrically connected to the processor. The memory stores programs to be executed by the processor and information used for processing by the processor.

The processor may include a baseband processor and a CPU. The baseband processor performs modulation/demodulation and coding/decoding of the baseband signal, and the like. The CPU executes the programs stored in the memory to perform various types of processing.

The backhaul communicator 240 is connected to a neighboring base station via the inter-base-station interface. The backhaul communicator 240 is connected to the AMF/UPF 300 via the base station to core network interface. Note that the gNBs may include a Central Unit (CU) and a Distributed Unit (DU) (i.e., may be functionally divided), and both units may be connected to each other via an F1 interface.

Figure 4:
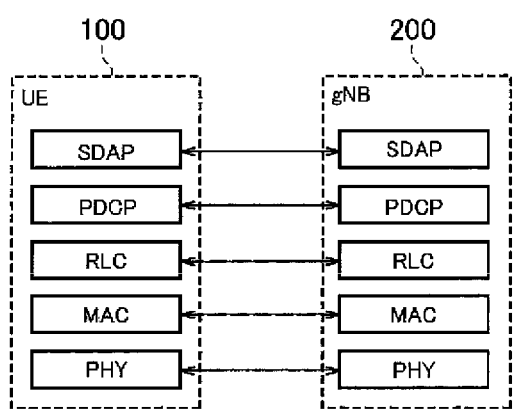
FIG. 4 is a diagram illustrating a configuration of a radio interface protocol stack in a user plane according to an embodiment.

FIG. 4 is a diagram illustrating a configuration of a radio interface protocol stack in a user plane handling data.

As illustrated in FIG. 4, the radio interface protocol in the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding/decoding, modulation/demodulation, antenna mapping/demapping, and resource mapping/demapping. Data and control information are transmitted via a physical channel between the PHY layer of the UE 100 and the PHY layer of the gNB 200.

The MAC layer performs priority control of data, retransmission processing by a hybrid ARQ (HARQ), random access procedure, and the like. Data and control information are transmitted via a transport channel between the MAC layer of the UE 100 and the MAC layer of the gNB 200. The MAC layer of the gNB 200 includes a scheduler. The scheduler determines uplink and downlink transport formats (a transport block size, and a modulation and coding scheme (MCS)) and resource blocks allocated to the UE 100.

The RLC layer transmits data to the RLC layer on the receiver side using the functions of the MAC layer and PHY layer. Data and control information are transmitted between the RLC layer of the UE 100 and the RLC layer of the gNB 200 via a logical channel.

The PDCP layer performs header compression/extension and encryption/decryption.

The SDAP layer performs mapping between an IP flow that is a unit of QoS control performed by the core network and a radio bearer that is a unit of QoS control performed by an Access Stratum (AS). Note that in a case where a RAN is connected to the EPC, the SDAP need not be provided.

Figure 5:
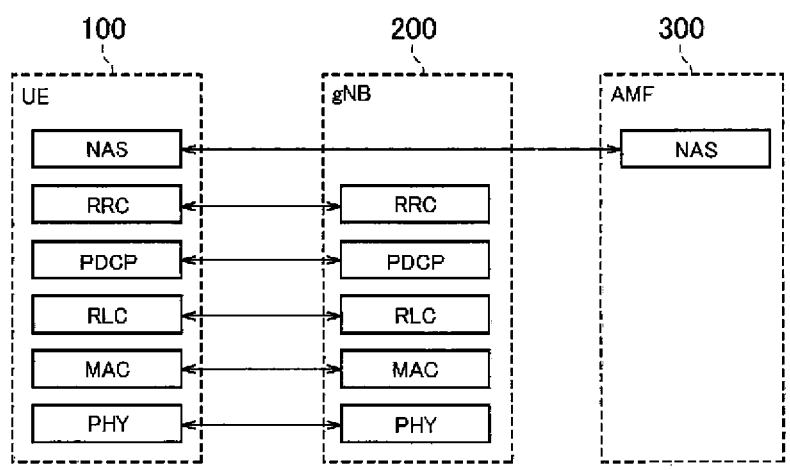
FIG. 5 is a diagram illustrating a configuration of a radio interface protocol stack in a control plane according to an embodiment.

FIG. 5 is a diagram illustrating a configuration of a radio interface protocol stack in a control plane handling signaling (control signal).

As illustrated in FIG. 5, the radio interface protocol stack in the control plane includes a Radio Resource Control (RRC) layer and a Non-Access Stratum (NAS) layer instead of the SDAP layer illustrated in FIG. 4.

RRC signaling for various types of configuration is transmitted between the RRC layer of the UE 100 and the RRC layer of the gNB 200. The RRC layer controls the logical channel, the transport channel, and the physical channel in response to establishing, re-establishing, and releasing the radio bearer. In a case where there is connection (RRC connection) between the RRC of the UE 100 and the RRC of the gNB 200, the UE 100 is in an RRC connected state. In a case where there is no connection (RRC connection) between the RRC of the UE 100 and the RRC of the gNB 200, the UE 100 is in an RRC idle state. In a case where the RRC connection is suspended, the UE 100 is in an RRC inactive state.

The RRC connected state and the RRC inactive state are states in which the RRC connection of the UE 100 is established. However, the RRC inactive state is a state in which the established RRC connection is suspended. Specifically, in the RRC inactive state, the context information of the UE 100 is held in the gNB 200 and the UE 100, and thus transition to the RRC connected state can be smoothly performed by using the held context information. The RRC idle state is a state in which the RRC connection of the UE 100 is not established.

The NAS layer located upper than the RRC layer performs session management, mobility management, and the like. NAS signaling is transmitted between the NAS layer of the UE 100 and the NAS layer of the AMF 300.

Note that the UE 100 includes an application layer or the like, in addition to the radio interface protocol.

Overview of Random Access Procedure

Now, an overview of the random access procedure will be described. This operation relates to a contention based random access procedure.

There are two types of random access procedures: a non-contention based random access procedure and a contention based random access procedure.

In the non-contention based random access procedure, a preamble sequence dedicated to the UE 100 is allocated to the UE 100 by the gNB 200, and the UE 100 uses the allocated preamble sequence to transmit a random access preamble to the gNB 200. The gNB 200 can uniquely identify the transmission source UE of the random access preamble, based on the preamble sequence of the random access preamble received from the UE 100.

On the other hand, in the contention based random access procedure, the UE 100 randomly selects a preamble sequence from among a plurality of preamble sequences prepared for the contention based random access procedure. Then, the UE 100 transmits the random access preamble to the gNB 200 by using the selected preamble sequence. The gNB 200 fails to uniquely identify the transmission source UE of the random access preamble. In a case where a plurality of pieces of UE 100 select the same preamble sequence and perform the contention based random access procedure at the same time, contention occurs, and thus an operation for resolving the contention is required.

A common contention based random access procedure is a four-step random access procedure that completes a random access procedure by four steps.

Figure 6:
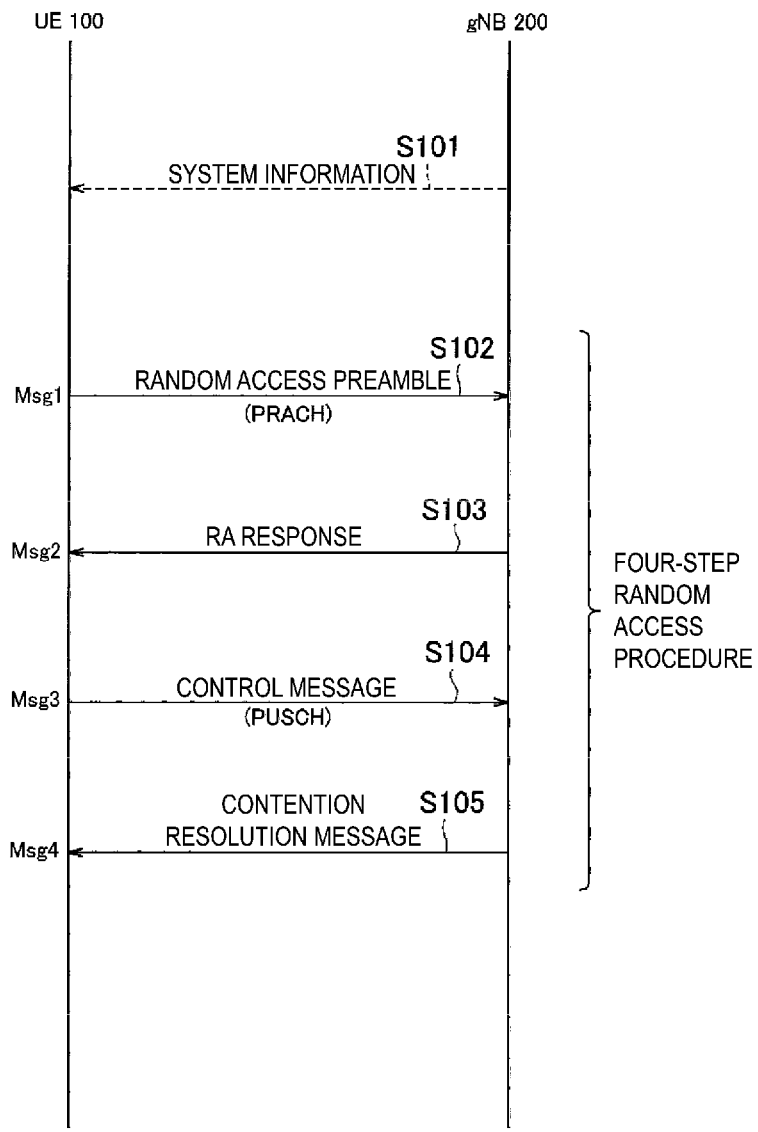
FIG. 6 is a diagram illustrating an example of a four-step random access procedure.

FIG. 6 is a diagram illustrating an example of the four-step random access procedure. The UE 100 in the RRC idle state or the RRC inactive state performs the random access procedure to transition to the RRC connected state. Such a case is referred to as initial connection. During the initial connection, the contention based random access procedure is applied. The UE 100 may perform the random access procedure to re-establish synchronization with the gNB 200.

As illustrated in FIG. 6, in step S101, the gNB 200 broadcasts system information (System Information Blocks (SIBs)) including Physical Random Access Channel (PRACH)-related information. The PRACH-related information includes information indicating PRACH resources that are time and frequency resources available to the PRACH.

The UE 100 selects any time and frequency resource from among the PRACH resources, based on the system information received from the gNB 200, and randomly selects a preamble sequence from among the plurality of preamble sequences.

In step S102, the UE 100 transmits the random access preamble to the gNB 200 by using the selected preamble resource. "Preamble resource" means a preamble sequence, but may be a concept that includes time and frequency resources. The random access preamble is referred to as Message 1 (Msg1) in the four-step random access procedure.

In step S103, the gNB 200 transmits a random access response (RA response) to the UE 100 in response to reception of Msg1 from the UE 100. The RA response is referred to as Message 2 (Msg2) in the four-step random access procedure.

Msg2 includes preamble information, an uplink grant (UL grant), a timing advance value, and a temporary identifier. Here, the preamble information is information indicating a preamble sequence of the random access preamble received from the UE 100. The UL grant is information indicating a PUSCH resource used by the UE 100 to transmit Msg3 described below. The timing advance value is a transmission timing adjustment value for compensating for a propagation delay of the radio signal. The temporary identifier is a Temporary Cell-Radio Network Temporary Identifier (C-RNTI) allocated to the UE 100 by the gNB 200.

In a case where the preamble sequence of the random access preamble transmitted in step S102 matches the preamble sequence indicated by the preamble information received from the gNB 200 in step S103, the UE 100 determines that the random access has succeeded. However, in a case where the plurality of pieces of UE 100 select the same preamble sequence and transmit the random access preambles at the same time, the plurality of pieces of UE 100 both may determine that the random access has succeeded, thereby leading to contention.

In step S104, in response to reception of Msg2, the UE 100 transmits, on a Physical Uplink Access Channel (PUSCH), a control message including the UE identifier of the UE 100. The control message is referred to as Message 3 (Msg3) in the four-step random access procedure. The UE identifier is an identifier that is different from the Temporary C-RNTI and unique to the UE 100.

In a case where the UE 100 is in the RRC idle state, Msg3 may be an RRC Setup Request message. In a case where the UE 100 is in the RRC inactive state, Msg3 may be an RRC Resume Request message.

In a case where contention occurs, the gNB 200 may receive a plurality of Msg3s associated with one Msg2, from a plurality of pieces of UE 100. In this case, the gNB 200 selects one of the plurality of pieces of UE 100.

In step S105, the gNB 200 transmits, to the selected UE 100, a contention resolution message including the UE identifier of the selected UE 100. The contention resolution message is referred to as Message 4 (Msg4) in the four-step random access procedure.

In a case where the UE 100 is in the RRC idle state, Msg4 may be an RRC Setup message. In a case where the UE 100 is in the RRC inactive state, Msg4 may be an RRC Resume message.

In response to reception of the contention resolution message including the UE identifier of the UE 100, the UE 100 determines that the random access procedure (contention resolution) has succeeded. In this case, the UE 100 may transition to the RRC connected state. The UE 100 having transitioned to the RRC connected state continuously uses, as the C-RNTI allocated to the UE 100, the Temporary C-RNTI included in Msg2 while the UE 100 is in the RRC connected state.

Two-Step Random Access Procedure

Now, a two-step random access procedure according to an embodiment will be described.

The two-step random access procedure completes the contention based random access procedure by a first step for performing transmission from the UE 100 to the gNB 200 and a second step for performing transmission from the gNB 200 to the UE 100 after the first step. This enables a reduction in exchanges of the messages compared to the four-step random access procedure, thus achieving an efficient and short-time random access procedure.

Note that not all the gNBs 200 support the two-step random access procedure and thus that the UE 100 supporting the two-step random access procedure is assumed to also support the four-step random access procedure.

(1) Example of Resources Used in First Step

Now, resources used in the first step of the two-step random access procedure will be described.

Figure 7:
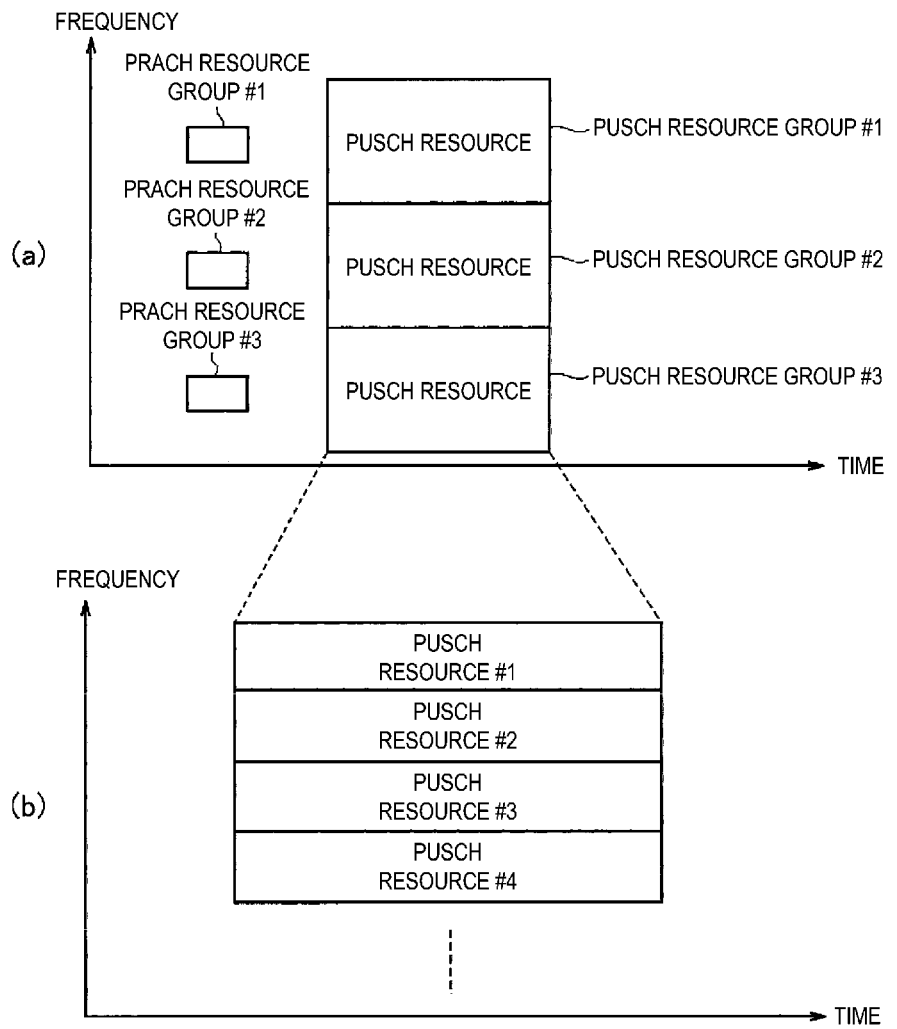
FIG. 7 is a diagram illustrating an example of resources used in a first step of a two-step random access procedure.

FIG. 7 is a diagram illustrating an example of resources used in the first step of the two-step random access procedure.

As illustrated in FIG. 7(a), a plurality of PRACH resource groups and a plurality of PUSCH resource groups are provided as resources to be used in the first step of the two-step random access procedure. The PRACH resource groups and the PUSCH resource groups are multiplexed together by time division.

The resource groups may be provided within the carrier frequency of one cell or may be distributed over a plurality of carrier frequencies. The example illustrated in FIG. 7(a) illustrates a case in which three PRACH resource groups are multiplexed by frequency division. However, the three PRACH resource groups may be multiplexed by time division. The example illustrates a case in which the three PUSCH resource groups are multiplexed by frequency division. However, the three PUSCH resource groups may be multiplexed by time division.

Each of the resource groups illustrated in FIG. 7(a) may include resources dedicated to the two-step random access procedure or used for the two-step random access procedure and the four-step random access procedure in common. Each of the resource groups illustrated in FIG. 7(a) is hereinafter assumed to include resources dedicated to the two-step random access procedure.

The three PRACH resource groups are associated with the three RRC states. For example, a PRACH resource group #1 is associated with the RRC idle state, a PRACH resource group #2 is associated with the RRC inactive state, and a PRACH resource group #3 is associated with the RRC connected state. The UE 100 selects a PRACH resource group associated with the RRC state of the UE 100 at the initiation of the random access procedure, and selects any PRACH resource from the selected PRACH resource group.

The three PUSCH resource groups are associated with the three RRC states. For example, a PUSCH resource group #1 is associated with the RRC idle state, a PUSCH resource group #2 is associated with the RRC inactive state, and a PUSCH resource group #3 is associated with the RRC connected state. The UE 100 selects a PUSCH resource group associated with the RRC state of the UE 100 at the initiation of the random access procedure, and selects any PUSCH resource from the selected PUSCH resource group.

By classifying resources in such a manner, the probability of contention is easily controlled for each RRC state. The sizes of the resource groups (resource amounts) are different in the different RRC states, thereby such control can be facilitated. Here, the adverse effect (service interruption, etc.) exerted by a possible contention increases in the order of the RRC idle state, the RRC inactive state, and the RRC connected state. Thus, the sizes of the resource groups are increased in this order to enable a reduction in the probability of contention in this order.

Alternatively, the resources may be classified according to access class, instead of classifying the resources according to RRC state as illustrated in FIG. 7(a). The access class is a class stored in the UE 100 (specifically, a Universal Integrated Circuit Card (UICC)), and access priority is configured for each class. For example, while access is restricted, control is performed such that network connection is restricted only for the UE 100 having access classes with low priorities, whereas network connection is not restricted for the UE 100 having access classes with high priorities. Thus, classifying the resources according to access class enables a reduction in the probability of contention for the UE 100 having access classes with high priorities.

Alternatively, instead of classifying the resources according to RRC state as illustrated in FIG. 7(a), the resources may be classified according to UE category or service to be performed by the UE (service permitted or configured by a higher layer). Examples of services include Ultra-Reliable and Low Latency Communication (URLLC) and NR-unlicensed (NR-U).

As illustrated in FIG. 7(b), each PUSCH resource group includes a plurality of PUSCH resources. In the example illustrated in FIG. 7(b), an example is illustrated in which a plurality of PUSCH resources are multiplexed by frequency division. However, the plurality of PUSCH resources may be multiplexed by time division. Each PUSCH resource may be associated with a preamble resource (preamble sequence). For example, the UE 100 selecting a preamble sequence #1 for the PRACH resource group #1 selects a PUSCH resource #1 associated with the preamble sequence #1 in the PUSCH resource group #1.

(2) Example of Operation Sequence

Figure 8:
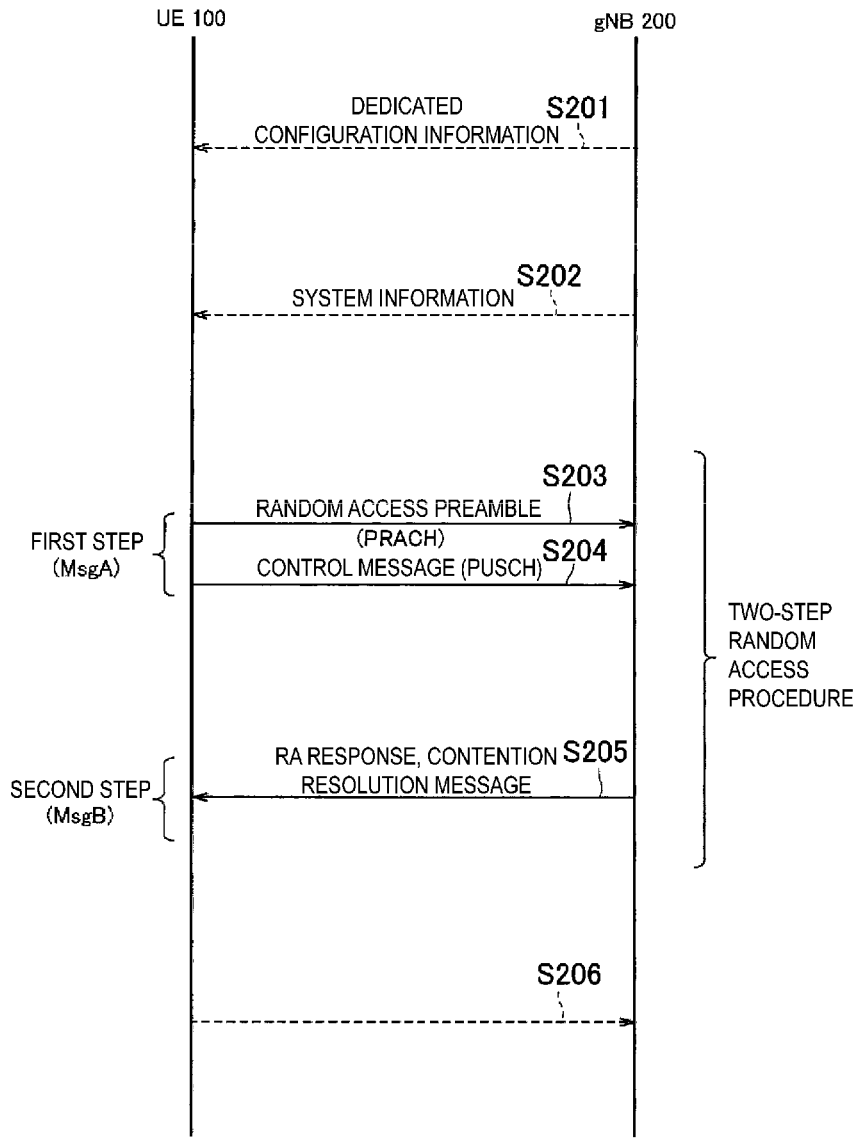
FIG. 8 is a diagram illustrating an example of an operation sequence associated with a two-step random access procedure according to an embodiment.

FIG. 8 is a diagram illustrating an example of an operation sequence associated with a two-step random access procedure according to an embodiment. In FIG. 8, the UE 100 is in the RRC idle state, the RRC inactive state, or the RRC connected state. In FIG. 8, each dashed line indicates signaling that is not essential. Differences from the four-step random access procedure described above will be mainly described below, and duplicate descriptions will be omitted.

As illustrated in FIG. 8, in step S201, the gNB 200 transmits, to the UE 100, a unicast message including configuration information indicating whether to permit the two-step random access procedure to be performed. At this time, the UE 100 is in the RRC connected state. The unicast message may include information indicating a correspondence relationship between the preamble resource (preamble sequence) and the PUSCH resource. The configuration information of the unicast message may be prioritized over various types of configuration information included in the system information (SIB) described below.

The unicast message may be an RRC Release message or an RRC Reconfiguration message. For the RRC Release message, the UE 100 follows the configuration information in the random access procedure used when the UE 100 transitions to the RRC idle state or the RRC inactive state and then transitions to the RRC connected state. For the RRC Reconfiguration message, the UE 100 may follow the configuration information in the random access procedure during the RRC connected state.

In step S202, the gNB 200 broadcasts the system information (SIB).

The SIB may include condition information indicating a condition for permitting the two-step random access procedure to be performed. The condition is the attribute of the UE 100 or state of the UE 100. For example, the condition may be at least one of the RRC state or the access class. In a case where the resources for the two-step random access procedure are classified according to condition, the condition information may be associated with the resources for the two-step random access procedure.

The UE 100 determines whether the two-step random access procedure is permitted to be performed based on the condition information included in the SIB. The UE 100 may determine a PRACH resource group and/or a PUSCH resource group for which the two-step random access procedure is permitted to be performed based on the condition information included in the SIB.

For example, as the condition information, the gNB 200 includes, in the SIB, information indicating an RRC state of the UE 100 that permits the two-step random access procedure to be performed. This information may be expressed as an RRC state for which the two-step random access procedure is not permitted to be performed. The information may be provided for each PRACH resource group, or for each PUSCH resource group (see FIG. 7(a)).

As the condition information, the gNB 200 may include, in the SIB, information indicating the access class of the UE 100 for which the two-step random access procedure is permitted to be performed. This information may be expressed as an access class for which the two-step random access procedure is not permitted to be performed. The information may be provided for each PRACH resource group, or for each PUSCH resource group (see FIG. 7(a)).

As the condition information, the gNB 200 may include, in the SIB, information indicating the UE category of the UE 100 for which the two-step random access procedure is permitted to be performed. This information may be expressed as a UE category for which the two-step random access procedure is not permitted to be performed. The information may be provided for each PRACH resource group, or for each PUSCH resource group (see FIG. 7(a)).

As the condition information, the gNB 200 may include, in the SIB, information indicating a service for which the two-step random access procedure is permitted to be performed (service that is permitted or configured by the higher layer). This information may be expressed as a service for which the two-step random access procedure is not permitted to be performed. The information may be provided for each PRACH resource group, or for each PUSCH resource group.

The SIB includes PRACH-related information. The PRACH-related information includes information indicating PRACH resources (time and frequency resources). The PRACH-related information for the two-step random access procedure and the PRACH-related information for the four-step random access procedure may be separately provided in the SIB.

The SIB may include association information indicating the PUSCH resources (time and frequency resources) associated with the preamble resources (preamble sequences) (see FIG. 7(b)). For example, the association information may include a list of the PUSCH resources, and entries in the list may be associated with the numbers of the preamble sequences. Alternatively, the association information may be a table or calculation formula for deriving a PUSCH resource from the number of a preamble sequence. Alternatively, such a table or calculation formula may be defined in system specifications and configured for the UE 100 in advance.

In response to reception, from the gNB 200, of the SIB including such association information, the UE 100 may determine that the gNB 200 supports the two-step random access procedure. On the other hand, in a case of not receiving, from the gNB 200, the SIB including the association information, the UE 100 may determine that the gNB 200 does not support the two-step random access procedure and may initiate the four-step random access procedure.

In step S203, the UE 100 selects a PRACH resource from the PRACH resource group available to the UE 100 and selects a preamble resource (preamble sequence). Then, the UE 100 uses the selected preamble resource to transmit the random access preamble (Msg1) to the gNB 200.

In step S204, the UE 100 transmits a control message (Msg3) to the gNB 200. The control message may include information similar to Msg3 in the four-step random access procedure.

In the four-step random access procedure, the UE 100 transmits the control message after receiving an RA response from the gNB 200. On the other hand, in the two-step random access procedure, the UE 100 transmits the control message even with no RA response from the gNB 200.

The UE 100 may transmit the control message by using the PUSCH resource associated with the preamble resource. This allows the gNB 200 to associate the random access preamble and the control message received from the UE 100. In other words, based on the association between the preamble resource and the PUSCH resource, the gNB 200 can determine whether the transmission source UE of the random access preamble and the transmission source UE of the control message are identical.

Alternatively, the preamble resource and the PUSCH resource need not be associated with each other. In such a case, the UE 100 transmits, to the gNB 200, a control message including preamble information (preamble number) indicating the preamble sequence of the random access preamble transmitted in step S203. This allows the gNB 200 to associate the random access preamble and the control message received from the UE 100, based on the preamble information included in the control message.

The control message also includes the UE identifier of the UE 100. In a case where the UE 100 is in the RRC idle state, the UE identifier may be an SAE-Temporary Mobile Subscriber Identity (S-TMSI) or a random value. In a case where the UE 100 is in the RRC inactive state, the UE identifier may be an Inactive RNTI (I-RNTI). The UE identifier of the UE 100 is included. In a case where the UE 100 is in an RRC idle state, the UE identifier may be a C-RNTI. The UE 100 may transmit only a part of the UE identifier (only MSB 8 bits, only LSB 4 bits, etc.). Whether such a shortened ID is used, the number of bits, and the like may be specified by the gNB 200.

Note that a combination of the random access preamble and the control message may be referred to as "MsgA".

In step S205, the gNB 200 transmits the RA response (Msg2) and the contention resolution message (Msg4) to the UE 100. For example, gNB 200 transmits the RA response and the contention resolution message in the same MAC PDU.

The RA response may include information similar to Msg2 in the four-step random access procedure. The contention resolution message may include information similar to Msg4 in the four-step random access procedure. Note that a combination of the RA response and the contention resolution message may be referred to as "MsgB". MsgB may include information indicating which resource group (see FIG. 7 (a)) is used for the random access to which the random access response corresponds.

An example will be described below in which the RA response includes preamble information and the contention resolution message includes a UE identifier.

The UE 100 determines whether the random access procedure has succeeded based on whether at least one of the first condition or the second conditions is satisfied. The first condition is a condition in which the preamble sequence of the random access preamble transmitted to the gNB 200 in the first step matches the preamble sequence indicated by the preamble information received from the gNB 200 in the second step. The second condition is a condition in which the UE identifier transmitted to the gNB 200 in the first step matches the UE identifier received from the gNB 200 in the second step.

For example, the UE 100 may determine that the random access procedure has succeeded in a case where at least the second condition is satisfied. The UE 100 may determine that the random access procedure has succeeded in a case where both the first condition and the second condition are satisfied.

In a case where at least the first condition is not satisfied, the UE 100 determines that the random access has failed (i.e., the gNB 200 does not correctly receive the random access preamble) and performs the two-step random access procedure again from the beginning.

Based on whether at least one of the first condition or the second condition is satisfied, the UE 100 may determine whether to perform the two-step random access procedure again or switch to the four-step random access procedure. For example, in a case where the first condition is satisfied and the second condition is not satisfied, the UE 100 considers that the random access has succeeded but that the contention resolution has failed, and switches to the four-step random access procedure. Then, the UE 100 omits transmission of the random access preamble (Msg1), and transmits, to the gNB 200, the control message (Msg3) in the four-step random access procedure.

In response to reception of the random access response in the four-step random access procedure (i.e., the random access response with no contention resolution message) from the gNB 200 after the first step (MsgA), the UE 100 considers that the two-step random access procedure has been rejected by the gNB 200. In this case, the UE 100 may be determined to switch to the four-step random access procedure. Then, the UE 100 omits transmission of the random access preamble (Msg1), and transmits, to the gNB 200, the control message (Msg3) in the four-step random access procedure.

In step S206, the UE 100 may transmit an RRC Setup Complete message or an RRC Resume Complete message. The UE 100 may include, in this message, at least one of the preamble information or the UE identifier.

Other Embodiments

In a non-contention based random access procedure, the gNB 200 may allocate the same non-contention preamble sequence for a plurality of pieces of UE 100 and perform control such that the non-contention preamble sequence is used on time division basis. Each of the plurality of pieces of UE 100 utilizes the preamble sequence allocated by the gNB 200, only at the timing permitted by the gNB 200. This allows the non-contention preamble sequence to be effectively utilized. This timing information may be a subframe pattern or a value applied to a predetermined formula (e.g., the value of N in "SFN mod N"). The non-contention preamble sequence and the timing information may be configured for the UE 100 by the gNB 200 by using the RRC Release message. Based on the usage of the non-contention preamble sequence, the gNB 200 may also notify, using the SIB for each non-contention preamble sequence, that the restriction on the time division is to be canceled (i.e., the non-contention preamble sequence is available at any time). In addition, the gNB 200 may provide, using the SIB, a notification disabling the configuration of the non-contention preamble sequence and the timing information.

In the embodiments described above, the 5G system (NR) has primarily been described. However, the operations according to embodiments may be applied to LTE.

Note that a program may be provided that causes a computer to execute each step of processing performed by the UE 100 or the gNB 200. The program may be recorded in a computer readable medium. Use of a computer readable medium enables the program to be installed on a computer.

Here, the computer readable medium on which the program is recorded may be a non-transitory recording medium. The non-transitory recording medium is not particularly limited, and may be, for example, a recording medium such as a CD-ROM, a DVD-ROM, or the like.

Circuits for performing the processes performed by the UE 100 or the gNB 200 may be integrated to configure at least a portion of the UE 100 or the gNB 200 as a semiconductor integrated circuit (chip set, SoC).

An embodiment has been described above in detail with reference to the drawings; however, specific configurations are not limited to those described above, and various design modifications can be made without departing from the gist of the present disclosure.

The invention claimed is:

1. A communication control method used for a user equipment, the communication control method comprising:
receiving a system information block (SIB) from a base station, the SIB including information indicating first PRACH resources used in a two-step random access procedure being a contention based random access procedure and information indicating second PRACH resources used in a four-step random access procedure;
receiving condition information from the base station, the condition information indicating a condition to be satisfied by a user equipment that is permitted for execution of the two-step random access procedure;
in response to determining that the user equipment satisfies the condition based on the condition information, transmitting to the base station, a MsgA in the two-step random access procedure using the first PRACH resources; and
in response to determining that the user equipment does not satisfy the condition based on the condition information, transmitting to the base station, a Msg1 in the four-step random access procedure using the second PRACH resources, wherein
the SIB includes information indicating a PUSCH resource associated with the first PRACH resources; and
transmitting the MsgA includes transmitting a preamble using the first PRACH resources and transmitting a control message using the PUSCH resource associated with the first PRACH resources.

2. The communication control method according to claim 1, further comprising:
considering that contention resolution has succeeded, in response to receiving, from the base station, a signal including an identifier of the user equipment.

3. The communication control method according to claim 1, further comprising:
in response to reception of a random access response from the base station after transmitting the MsgA, determining to switch to a four-step random access procedure; and
in response to the determination to switch, transmitting Msg3 in the four-step random access procedure, to the base station.

4. The communication control method according to claim 1, wherein
the SIB includes information indicating a service type associated with the first PRACH resources or the second PRACH resources.

5. A user equipment comprising a processor and a memory, the processor configured to
receive a system information block (SIB) from a base station, the SIB including information indicating first PRACH resources used in a two-step random access procedure being a contention based random access procedure and information indicating second PRACH resources used in a four-step random access procedure;

receive condition information from the base station, the condition information indicating a condition to be satisfied by a user equipment that is permitted for execution of the two-step random access procedure;

in response to determining that the user equipment satisfies the condition based on the condition information, transmit to the base station, a MsgA in the two-step random access procedure using the first PRACH resources; and in response to determining that the user equipment does not satisfy the condition based on the condition information, transmit to the base station, a Msg1 in the four-step random access procedure using the second PRACH resources, wherein the SIB includes information indicating a PUSCH resource associated with the first PRACH resources, and in transmitting the MsgA, the processor is configured to transmit a preamble using the first PRACH resources and transmit a control message using the PUSCH resource associated with the first PRACH resources.

6. An apparatus used for controlling a user equipment, comprising:

a processor and a memory, the processor configured to receive a system information block (SIB) from a base station, the SIB including information indicating first PRACH resources used in a two-step random access procedure being a contention based random access procedure and information indicating second PRACH resources used in a four-step random access procedure;

receive condition information from the base station, the condition information indicating a condition to be satisfied by a user equipment that is permitted for execution of the two-step random access procedure;

in response to determining that the user equipment satisfies the condition based on the condition information, transmit to the base station, a MsgA in the two-step random access procedure using the first PRACH resources; and in response to determining that the user equipment does not satisfy the condition based on the condition information, transmit to the base station, a Msg1 in the four-step random access procedure using the second PRACH resources, wherein the SIB includes information indicating a PUSCH resource associated with the first PRACH resources, and in transmitting the MsgA, the processor is configured to transmit a preamble using the first PRACH resources and transmit a control message using the PUSCH resource associated with the first PRACH resources.

* * * * *